Dec. 24, 1946.  B. A. SWENNES ET AL  2,413,264
MOUNTING FOR AUTOMOTIVE MOTOR AND TRANSMISSION ASSEMBLY
Filed March 29, 1944  2 Sheets-Sheet 1
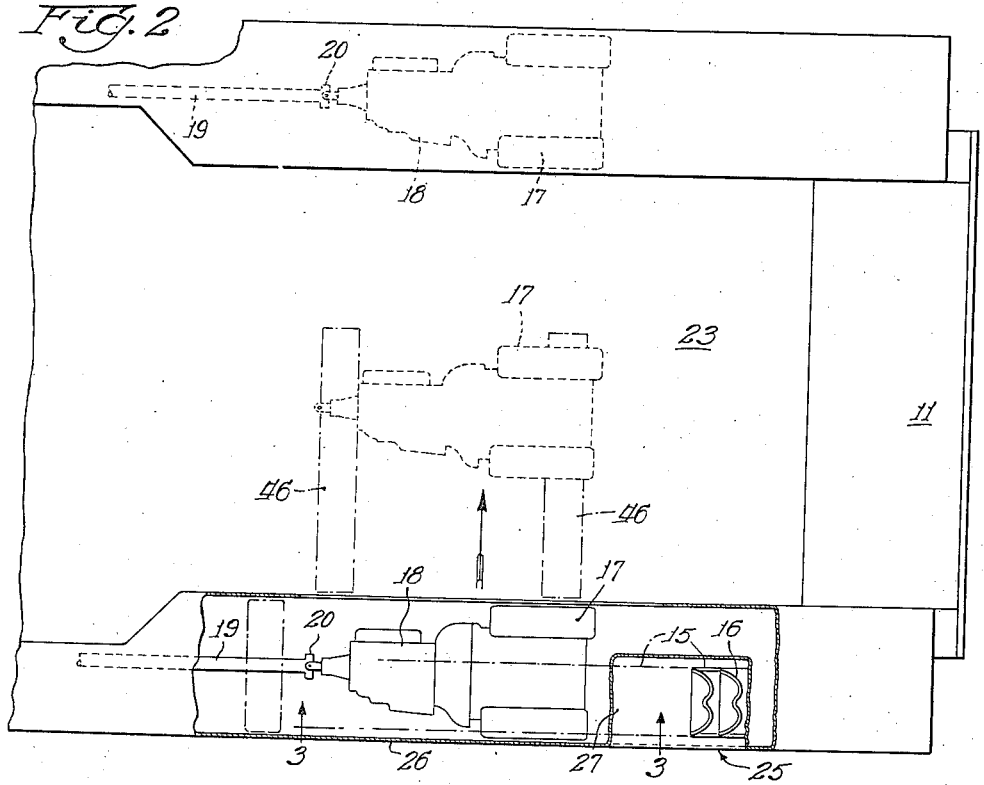
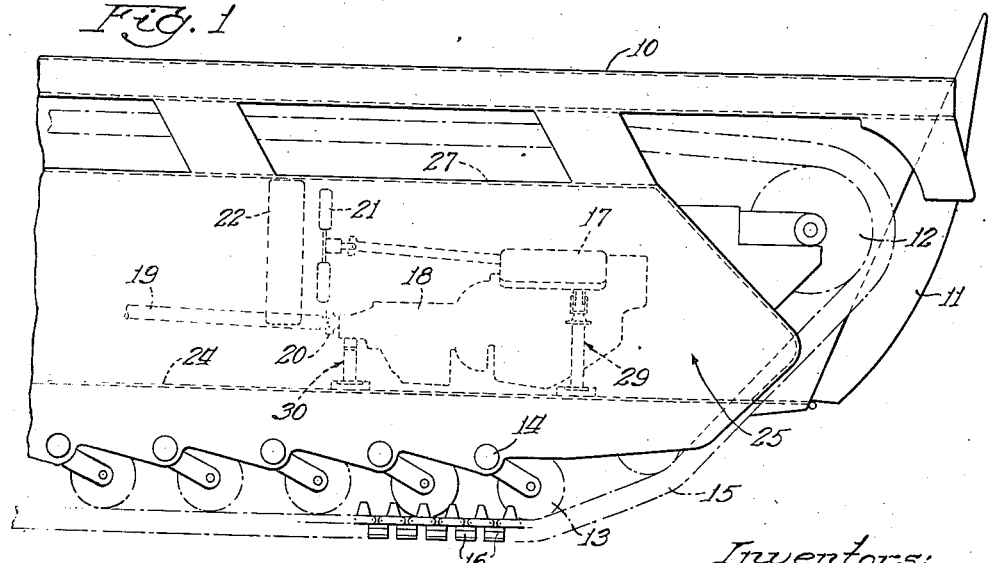
Inventors:
Benjamin A. Swennes
and Lee E. Shelton.
By: Edward C. Dizbaugh
Atty.

Dec. 24, 1946.  B. A. SWENNES ET AL  2,413,264
MOUNTING FOR AUTOMOTIVE MOTOR AND TRANSMISSION ASSEMBLY
Filed March 29, 1944  2 Sheets-Sheet 2
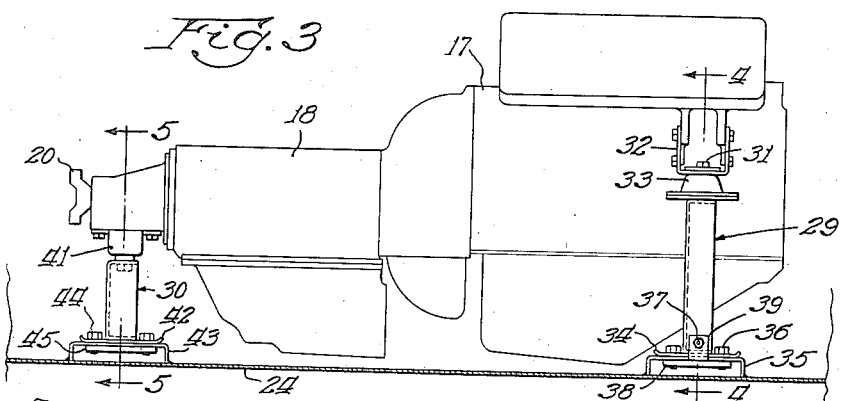
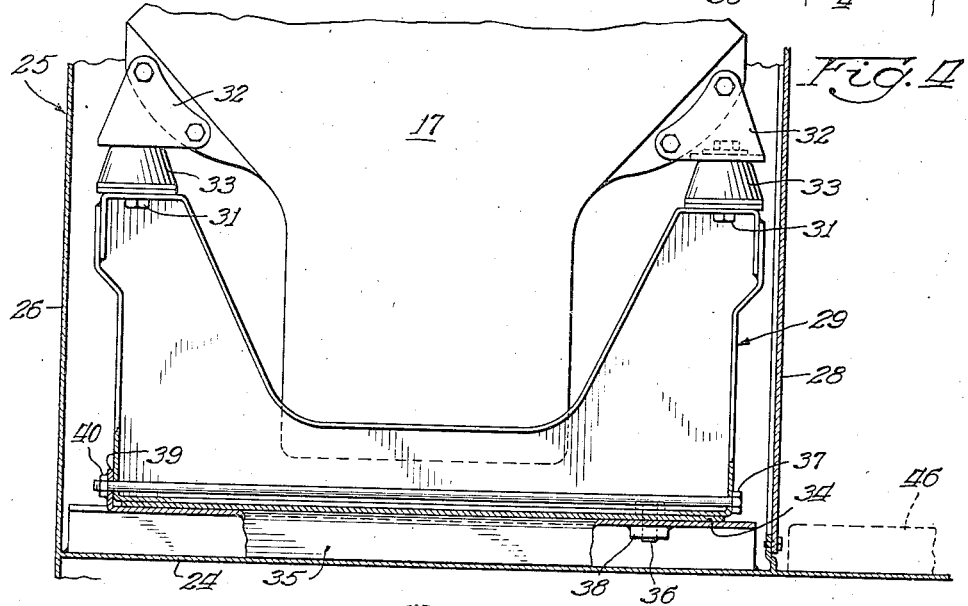
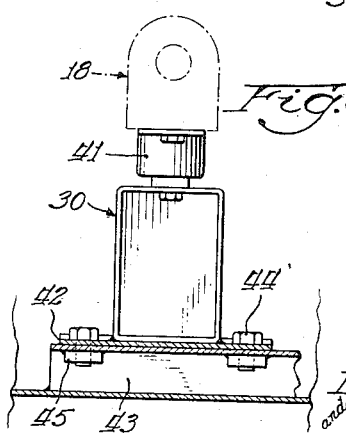
Inventors:
Benjamin A. Swennes
and Lee E. Shelton.
By Edward C. Britzbough
Atty.

Patented Dec. 24, 1946

2,413,264

UNITED STATES PATENT OFFICE 2,413,264

MOUNTING FOR AUTOMOTIVE MOTOR AND TRANSMISSION ASSEMBLY

Benjamin A. Swennes, Rockford, Ill., and Lee E. Shelton, Kalamazoo, Mich., assignors to Borg-Warner Corporation, Chicago, Ill., a corporation of Illinois Application March 29, 1944, Serial No. 528,568

10 Claims. (Cl. 180—64)

1

Our invention relates to motor vehicles and more particularly to motor vehicles of the type having a pair of spaced motors for providing the motive power for driving the vehicle.

In a co-pending application of Benjamin A. Swennes having Serial Number 508,304 and filed October 30, 1943, there is disclosed an amphibian motor vehicle propelled by a pair of motors. The motors are spaced and are disposed adjacent the opposite sides of the vehicle in sponsons forming housings for the motors so as to provide a cargo space in the vehicle between the motors. Since one side of each of the motors is adjacent a side of the vehicle, only the opposite sides of the motors are accessible from the interior of the vehicle for servicing and repairing purposes. It is an object of the present invention to arrange and construct the parts of a vehicle of this type so that ready access may be had to not only the sides of the motors facing the cargo space but also the opposite sides of the motors adjacent the sides of the vehicle.

It is also an object of our invention to mount the motors in such a vehicle so that the motors, after being disconnected from their accessories fixed in the housings, such as radiators, may be moved into the cargo space of the vehicle and access may thus be had to both sides of the motors.

It is a further object of our invention to provide improved mountings for the motors in such a vehicle so that the motors are fixed on their sides accessible from the interior of the vehicle as well as on their sides which are inaccessible from the interior of the vehicle and the mountings are such as to be releasable from the accessible sides of the motors, whereby the motors may thereafter be moved into the cargo space.

The invention consists of the novel constructions, arrangements and devices to be hereinafter described and claimed for carrying out the above stated objects and such other objects as will appear from the following description of a certain preferred embodiment illustrated in the accompanying drawings, wherein:

Fig. 1 is a fragmentary side elevational view of an amphibian vehicle of the type disclosed in the aforementioned co-pending Swennes application and embodying the principles of our invention;

Fig. 2 is a fragmentary plan view of the amphibian vehicle;

Fig. 3 is a side elevational view on an enlarged scale of one of the vehicle motors and the transmission connected in tandem therewith together with the mountings therefor;

2

Fig. 4 is a sectional view taken on line 4—4 of Fig. 3; and

Fig. 5 is a sectional view taken on line 5—5 of Fig. 3.

Like characters of reference designate like parts in the several views.

Referring to Figs. 1 and 2 of the drawings, there is fragmentarily illustrated an amphibian vehicle which is intended for use primarily as a cargo carrier and is of the type disclosed in the aforesaid co-pending Swennes application. The vehicle comprises a vehicle body 10 which is water tight and has a gate 11 hingedly mounted on an end thereof for access into the body. The vehicle body on each side thereof has an idler wheel 12 and a plurality of bogie wheels 13 mounted thereon. The bogie wheels 13 on the bottom of the body are connected with the body by means of yielding swinging connections 14 which may be of any suitable construction such that the body is supported by these wheels. An articulated track 15 is disposed about the wheels 12 and 13 and the track is driven by any suitable means adjacent the end of the vehicle not illustrated. The track 15 comprises shoes 16 formed with radially extending flanges of any suitable shape so that the vehicle is driven through the water by movement of the tracks 15 about the wheels 12 and 13, and the vehicle may be driven overland by the tracks 15 similar to ordinary track laying vehicles.

The track propelling means on the end of the vehicle not illustrated is driven from a pair of spaced motors 17 in the vehicle. Each of the motors 17 has a transmission 18 connected in tandem therewith, and the transmission is connected with a drive shaft 19 by means of a universal joint 20. The track propelling means on the end of the vehicle not illustrated is driven by the shafts 19. The propelling means may be of any suitable construction; however, its construction preferably is such that either of the motors may drive the tracks on both sides of the vehicle when the other motor is inoperative. Each of the motors has connections with various accessories necessary for the proper functioning of the motor, such as a fan 21 and a radiator 22. The vehicle provides a cargo space 23 between the two motors 17 and their shafts 19, as may be seen from the drawings. The deck 24 of the vehicle provides the cargo carrying surface, and cargo may be loaded into the vehicle by dropping the gate 11 and using it as a ramp.

For details of various arrangements and constructions in the amphibian vehicle which has been so far somewhat broadly described, the aforesaid co-pending Swennes application may be referred to.

Referring now particularly to Figs. 3 to 5 of the drawings, it will be observed that each of the motors 17 is disposed and housed in a sponson 25 on the side of the body 10. The sponson is formed by the deck 24, a side 26 of the vehicle, and an upper wall portion 27 of the vehicle, and one of the tracks 15 extends around each of the sponsons as shown. A panel 28 is provided for closing each of the motor housings within the body 10, as shown. The panels 28 are removable so that the inner sides of the motors are accessible for any necessary repair work that must be done on the motors; however, due to the fact that the motors are disposed adjacent the sides 26 of the vehicle and under the wall portions 27, the other sides of the motors are in general inaccessible from the interior of the vehicle. It is thus substantially impossible to make any necessary repairs on these sides of the motors while the motors are in their housings. We therefore provide mounting means for the motors which will allow the motors, when disconnected from their accessories in the housing, to be moved out of the housings into the cargo space 23 so that complete access may be had to all sides of the motors, and this feature will now be described.

Each of the motors 17 and its transmission 18 in tandem therewith are connected together and are so mounted that they may be moved as a unit out of the housing for the unit and into the cargo space for making any necessary repairs. The mounting for the motor includes a flanged U-shaped supporting member 29, and the mounting for the transmission includes a flanged rectangular member 30, and the members 29 and 30 together support the motor and transmission unit. The motor is fixed on the supporting member 29 by means of bolts 31 extending through the flange of the member 29 and through side supports 32 fixed to the motor. Rubber cushioning members 33 are disposed between the supporting member 29 and the supports 32, and the bolts 31 extend through the members 33, so that the motor is resiliently mounted on the member 29. The U-shaped supporting member 29 is fixed to a skid 34, and the skid rests on a channel 35 which is fixed to the deck 24.

The U-shaped supporting member 29 for each of the motors 17 is fixed with respect to the deck 24 by means of a pair of short bolts 36 and a long bolt 37. The bolts 36, which are readily accessible from the cargo space 23, extend through the skid 34 and the web of the channel 35 and are screwed into a reinforcing block 38 fixed to the web of the channel 35 on its lower face. These bolts 36 thus function to fix the U-shaped supporting member 29 at its side which is adjacent the cargo space 23 and is accessible from the cargo space to the channel 35 and thereby the deck 24. The bolt 37 extends through the flanges of the U-shaped member 29 from the accessible side of the motor to the inaccessible side thereof, and the bolt passes through a lug 39 formed on the inaccessible side of the channel 35 and is screwed into a nut 40 fixed to the lug 39. The bolt 37 thus functions to fix the U-shaped member 29 with respect to the channel 35 and the deck 24 at the inaccessible side of the motor.

Each of the supports 30 yieldably supports a transmission 18 by means of a rubber cushioning member 41 disposed between the transmission and the support. The support 30 is fixed to a skid member 42 which rests upon a channel 43 fixed to the deck 24. A plurality of bolts 44 extend through the web of the skid 42 and the web of the channel 43 and are screwed into reinforcing blocks 45 fixed to the web of the channel 43 on its lower face. These bolts 44, which are readily accessible from the cargo space 23, thus function to hold the support 30 and the transmission 18 fixed with respect to the channel 43 and the deck 24.

When it is desired to remove either of the motor and transmission units from its housing for repair work thereon, the unit is detached from its accessories in the housing, as for example its fan 21 and its radiator 22, and the universal joint 20 is disassembled to break the drive from the transmission 18 to the drive shaft 19. The bolts 36 and 44 are then unscrewed from the respective reinforcing blocks, and the bolt 37 is unscrewed from its nut 40, and the unit may then be pulled out of its housing with the skid members 34 and 42 sliding on the channels 35 and 43. Blocks 46 are preferably placed outside of the housing in the cargo space so that the skid plates 34 and 42 may slide on to the blocks, and the motor and transmission unit may be moved out into the cargo space 23 any desired distance.

After the necessary repair work is completed, the motor and transmission unit may be slid back into its housing with the skid plates 34 and 42 sliding on the blocks 46 and onto the channels 35 and 43 to bring the unit back into its proper place. The bolts 36 are then replaced to fix the motor supporting member 29 at its accessible side with respect to the deck 24, and the bolt 37 is replaced to fix the other side of the supporting member 29 with respect to the deck. The bolts 44 are replaced, and these hold the other end of the unit in place. The accessories in the motor-transmission housing such as the fan 21 and radiator 22 are then again properly connected with the motor.

Our improved mountings for the motor and transmission units in the illustrated vehicle allow the units to be facilely moved out of their housings into the cargo space of the vehicle for repair. The mountings for the motors are releasably fixed at both the accessible and inaccessible sides of the motor with respect to the deck of the vehicle, and the motor supports at their inaccessible sides adjacent the sides of the vehicle are advantageously releasable from their accessible sides adjacent the cargo space 23.

We wish it to be understood that our invention is not to be limited to the specific constructions and arrangements shown and described, except only insofar as the claims may be so limited, as it will be apparent to those skilled in the art that changes may be made without departing from the principles of the invention.

We claim:

1. In combination, a motor, a housing for said motor, said housing having an opening therein on one side of the motor and permitting access to only that side of the motor, means allowing movement of said motor out of said housing through said opening whereby access may be had to both sides of the motor, means for releasably fixing said motor at its accessible side with respect to the bottom of said housing, and means for releasably fixing said motor at its inaccessible side with respect to the bottom of said housing, both of said last two named means being operable from the accessible side of said motor.

2. In combination, a motor, a housing for said motor, said housing having an opening therein on one side of the motor and permitting access to only that side of the motor, means allowing movement of said motor out of said housing through said opening whereby access may be had to both sides of the motor, a bolt for releasably fixing said motor to the bottom of said housing at the accessible side of the motor, and a bolt extending from said last-named side of the motor to the inaccessible side thereof for fixing said motor at said latter side to the bottom of the housing and being releasable from the accessible side of the motor.

3. In combination, a motor, a housing for said motor, said housing having an opening therein on one side of the motor and permitting access to only that side of the motor, a driven shaft connected with said motor in the housing to be driven thereby, said motor being disconnectible from said driven shaft, and means allowing movement of the motor sidewardly out of said housing through said opening after disconnection from said shaft whereby access may be had to both sides of the motor, means for releasably fixing said motor at its accessible side with respect to the bottom of said housing, and means for releasably fixing said motor at its inaccessible side with respect to the bottom of said housing, both of said last two named means being operable from the accessible side of said motor.

4. In combination, a motor, a transmission connected in tandem with said motor so as to form an assembly therewith, a housing for said assembly, said housing having an opening therein on one side of the assembly and permitting access to only that side of the assembly, a driven shaft connected with said assembly to be driven thereby, said assembly being disconnectible from said driven shaft, a skid on said motor and a skid on said transmission for supporting the assembly and allowing movement of the assembly sidewardly out of said housing through said opening after disconnection from said shaft whereby access may be had to both sides of the assembly, means operable from the accessible side of the assembly for releasably fixing the skid for said transmission to the bottom of said housing, means for releasably fixing said motor at its accessible side with respect to the bottom of said housing, and means for releasably fixing said motor at its inaccessible side with respect to the bottom of said housing, both of said last two named means being operable from the accessible side of said motor.

5. In combination, a motor, a housing for said motor, said housing having an opening therein on one side of the motor and permitting access to only that side of the motor, a U-shaped support for said motor movable with respect to the bottom of said housing whereby to allow movement of the motor out of the housing through said opening whereby access may be had to both sides of the motor, a bolt for releasably fixing said U-shaped support with respect to the bottom of said housing at the accessible side of said motor, and a bolt operable from the accessible side of said motor and extending through said U-shaped support for releasably fixing said support with respect to the bottom of the housing at the inaccessible side of said motor.

6. In combination, a motor, a housing for said motor, said housing having an opening therein on one side of the motor and permitting access to only that side of the motor, a U-shaped support for said motor, a skid plate under said support for allowing said motor to be skidded out of said housing through said opening whereby access may be had to both sides of the motor, a bolt for releasably fixing said support and skid plate with respect to the bottom of said housing at the accessible side of the motor, and a bolt operable from the accessible side of said motor and extending through said U-shaped support for releasably fixing said support with respect to the bottom of the housing at the inaccessible side of said motor.

7. In combination, a motor, a transmission connected in tandem with said motor so as to form an assembly therewith, a housing for said assembly, said housing having an opening therein on one side of the assembly and permitting access to only that side thereof, a support for said transmission unit and a U-shaped support for said motor, said supports supporting said assembly and allowing movement of the assembly out of said housing through said opening whereby access may be had to both sides of the assembly, means for releasably fixing the transmission support with respect to the bottom of the housing, means for releasably fixing said U-shaped support at the accessible side of said motor with respect to the bottom of said housing, and a bolt operable from the accessible side of said motor and extending through said U-shaped support for releasably fixing said support with respect to the bottom of the housing at the inaccessible side of said motor.

8. In combination, a motor, a transmission connected in tandem with said motor so as to form an assembly therewith, a housing for said assembly, said housing having an opening therein on one side of the assembly and permitting access to only that side of the assembly, a support for said transmission and a U-shaped support for said motor for together supporting the assembly, a skid plate under each of said supports whereby the assembly may be moved out of said housing through said opening and access may be had to both sides of the motor, a bolt operable from the accessible side of the assembly for releasably fixing said transmission support and skid plate therefor to the bottom of said housing, a bolt for releasably fixing the U-shaped support and associated skid plate with respect to the bottom of the housing at the accessible side of the motor, and a bolt operable from the accessible side of said motor and extending through said U-shaped support for releasably fixing said support with respect to the bottom of the housing at the inaccessible side of said motor.

9. In combination, a motor, a transmission connected in tandem with said motor so as to form an assembly therewith, a housing for said assembly, said housing having an opening therein on one side of the assembly and permitting access to only that side of the assembly, a driven shaft connected with said transmission to be driven thereby, said transmission being disconnectible from said driven shaft, a support for said transmission and a U-shaped support for said motor, said supports together supporting said assembly, a bolt operable from the accessible side of said assembly for fixing said transmission support to the bottom of said housing, a bolt for fixing said U-shaped support to the bottom of said housing at the accessible side of the assembly, and a bolt operable from the accessible side of said motor and extending through said U-shaped support for releasably fixing said support with respect to the bottom of the housing at the inaccessible side of said motor.

10. In combination, a motor, a transmission connected in tandem with said motor and forming an assembly therewith, a housing for said assembly, said housing having an opening therein on one side of the assembly and permitting access to only that side of the assembly, a driven shaft connected with said transmission to be driven thereby, said transmission being disconnectible from said driven shaft, a pair of spaced channels fixed to the bottom of said housing and extending sidewardly of said assembly toward said opening, a support for said transmission and resting on one of said channels, a U-shaped support for said motor and resting on the other of said channels, a skid plate between each of said supports and its respective channel for permitting the assembly to be skidded out of said housing through said opening whereby access may be had to both sides of the assembly, a plurality of bolts operable from the accessible side of said assembly for fixing said transmission support and its skid plate to the channel on which the support rests, a bolt for fixing said U-shaped support and the skid plate underneath the support at the accessible side of the assembly to the channel on which the support rests, and a bolt extending through the sides of said U-shaped support from the accessible side of the assembly to the inaccessible side thereof and extending into a portion of the channel for the U-shaped support for fixing the inaccessible side of the U-shaped support with respect to the bottom of the housing.

BENJAMIN A. SWENNES.
LEE E. SHELTON.